United States Patent Office 3,228,774
Patented Jan. 11, 1966

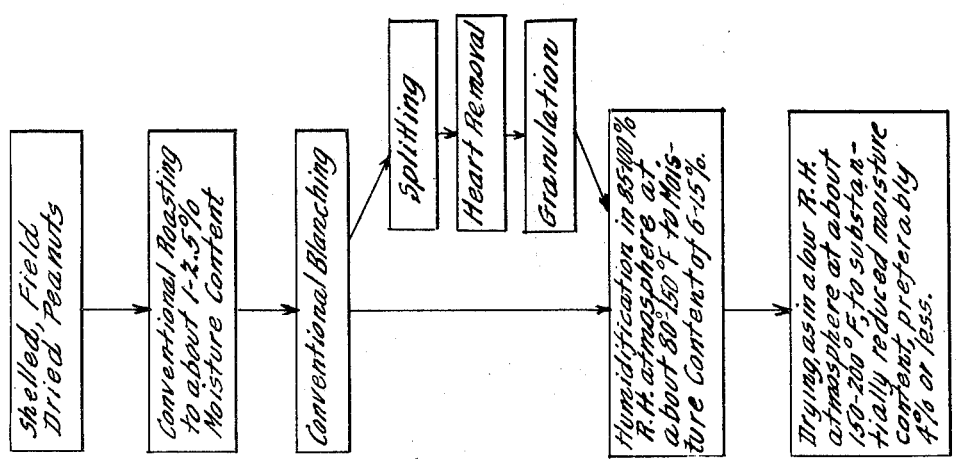
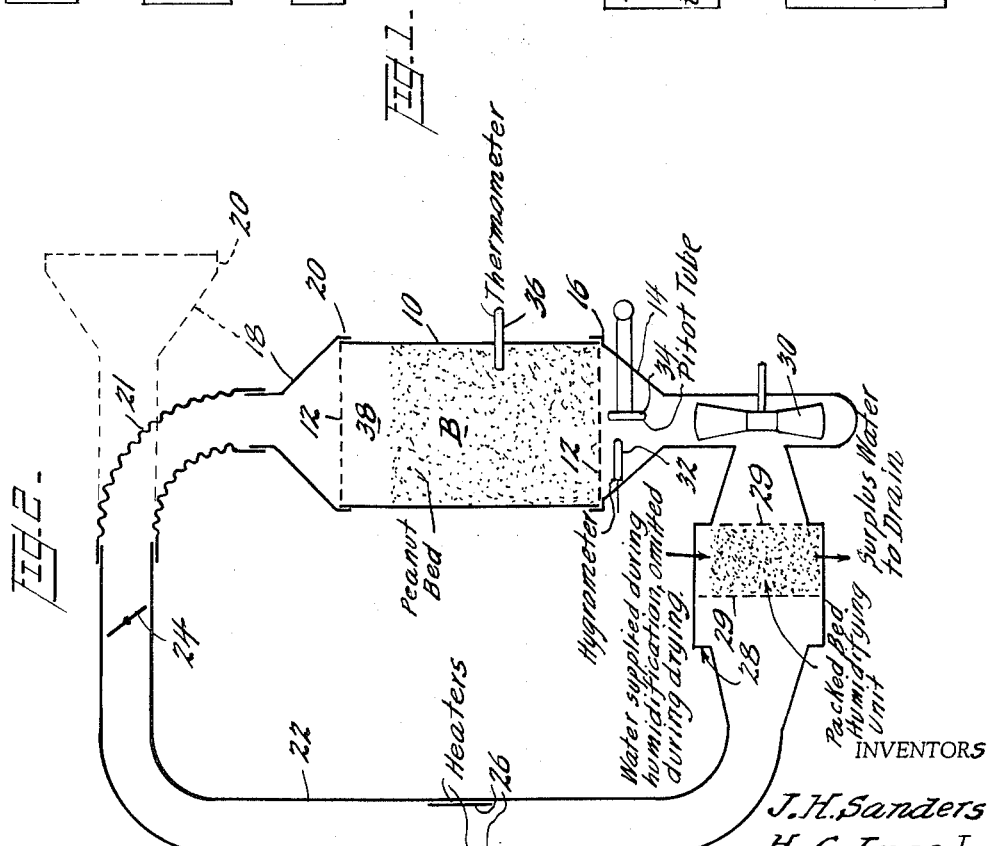

3,228,774
PROCESS FOR REMOVING STRONG FLAVOR COMPONENTS FROM ROASTED PEANUTS
Judson H. Sanders, Wyoming, and Harsch C. Ince, Jr., Cincinnati, Ohio, assignors to The Procter & Gamble Company, Cincinnati, Ohio, a corporation of Ohio
Filed Mar. 29, 1963, Ser. No. 268,959
12 Claims. (Cl. 99—126)

The present invention relates to the treatment of peanuts and is directed more precisely to a process for removing undesirable dominant flavor characteristics from roasted peanuts.

It is well known that if raw shelled peanuts are heated in an oven maintained at between about 290–350° F., usually about 325° F., for a sufficient period of time, say about 20–30 minutes, the peanuts become crisp and frangible, darken in color from a creamy-white to a light golden to cocoa brown according to the severity of the time and temperature, and acquire a strong nutty flavor. This treatment is known in the art as roasting. However, due to its extremely pronounced or dominant quality, this flavor does not blend very well with other more delicate flavors. Moreover, when roasted peanuts are employed in food products based on an aqueous system, i.e. which have an appreciable content of free water, such as ice cream, cake and cookie batters, jellies, preserves, relishes, pie fillings and so on, they tend to acquire a bitter flavor accompanied by an unpleasant, rancid-like odor. It is primarily for this reason that roasted peanuts are rarely, if ever, encountered in this class of edibles, but appear almost exclusively in dry foods.

Apart from their flavor, roasted peanuts have another valuable characteristic, namely a brittle, crunchy texture in the mouth. On the grounds of this distinctive bite, peanuts would be a valuable additive to numerous food products based on an aqueous system to impart zest, variety and interest in eating quality, were it not for their tendency to revert to off-flavor and to override and distort the other desirable flavors of the products.

It has now been discovered that one can successfully treat typically roasted and blanched peanuts, in the form of either whole kernels or granules, in such a way as to remove or eliminate therefrom at least the major portion of their normal strong, dominant flavor characteristics, and obtain a peanut product substantially unchanged in physical form and nutritional value, which product is surprisingly free of any tendency toward the development of off-flavors when incorporated in culinary products based on an aqueous system, and is peculiarly adapted to supply texture interest to food products generally having ascendant flavoring characteristics other than of roasted peanuts, especially those of a rather delicate or subtle nature. In essence, the treatment of the present invention contemplates exposing conventionally roasted and blanched peanuts to a humidifying atmosphere under controlled conditions to increase the moisture content thereof within predetermined limits and thereafter drying the peanuts until the moisture content has been reduced to the desired ultimate level.

The choice of the type of peanuts to be treated in accordance with the present invention does not appear to be critical. No essential difference has been found, for example, between the so-called Spanish, Virginia and Runner varieties.

Before being exposed to the novel steps of the treatment of the present invention, the peanuts are shelled, roasted and blanched. The techniques involved in roasting are highly developed at the present time. Dependent upon the severity of time and temperature, the color of the roasted peanuts may extend from very light to very dark and the moisture level determined after the peanuts have cooled may spread from as low as about 1% to as high as about 2.5%. For a more complete understanding of the details of roasting and the equipment suitable for its performance, reference may be made to USDA Bulletin AIC–370, dated March, 1954 and entitled, "Peanut Butter" of the Agricultural Research Service, Southern Utilization Research Branch, U.S. Department of Agriculture, the publications cited therein and other industry sources.

After the peanuts have been roasted to the desired color and taste, they are blanched, which is the term applied to the step of removing the skins or testa from the kernels and split if desired. A number of mechanical devices have been developed for performing this operation and any of the commercially available machines of this type can be employed.

If the kernels are split for treatment in the form of halves or particles obtained from halves, it is normally desirable that the heart or germ be removed, for example, by screening with a ¼ inch mesh size screen.

All of the operations mentioned up to this point are entirely conventional. In essence, this invention can be considered to start with suitably roasted and blanched peanut kernels having a moisture content in the range of about 1–2.5%. It is normally preferred to take advantage of the higher efficiency afforded by smaller particle sizes if possible. To this end, the split, heart-free kernels are granulated and classified as to size to produce the fraction of particle sizes selected for treatment.

The peanut halves can be passed through a hammer mill, a roller mill, or any of the various grinders, crushers, choppers, cutters and like mechanisms known in the art for subdividing materials similar to peanuts. More than one pass of the peanuts through the mill is possible and a second pass of any oversize particles from the first pass is particularly recommended to increase the proportion of the useful fraction.

Any conventional screening equipment functioning either on a batch or continuous basis can be used to recover the desired fraction.

The peanuts, either in the form of whole kernels, half kernels, or in the desired fraction of granulated particles, hereinafter referred to collectively as "peanut pieces," are now ready for treatment in accordance with the present invention. The first step in this treatment contemplates the humidification of the peanut pieces to raise their moisture content within the range of about 6–15%. This is accomplished by exposing the peanut pieces to intimate contact with a gaseous medium or atmosphere having a high relative humidity. The humidifying agent of this atmosphere is water vapor; as far as is presently known, other comparable moisturizing liquids do not give comparable results and should be avoided. As the atmosphere or carrier gas for the water vapor, air is very much preferred on the grounds of low cost, ready availability, and ease of handling in unsealed systems, but other gases, such as nitrogen, carbon dioxide, helium, argon, krypton, etc., can be substituted if cost is no object and provision is made to exclude air.

If the other treatment conditions are held more or less constant, it has been found that an equilibrium will eventually be established between the moisture content or relative humidity of the humidifying medium and the moisture content of the peanuts. Thus, a relative humidity of about 60% will give an equilibrium moisture content of about 6% in the peanuts and a relative humidity of about 100% will give an equilibrium moisture content of about 11–12% in the peanuts. The period of time required to reach equilibrium may be shortened by increasing the relative humidity of the medium above the equilibrium value corresponding to the moisture content of the peanuts. In brief, the relative humidity of the medium has two effects: First, it imposes a limit on the ultimate possible peanut moisture content and, second, it controls the rate of humidification assuming that other conditions are not materially altered.

In practice, the second effect is the more significant and extensive experimentation has, in fact, shown that the relative humidity of the medium must be at least about 85% if a peanut moisture content within the prescribed range is to be achieved within a practicable period of time. For example, with an atmosphere having a relative humidity below 80%, no appreciable increase in peanut moisture content is obtained after exposure for a period of a few hours. At the other extreme, 100% relative humidity is ideal but is difficult to attain in practice, for reasons that will be explained subsequently. 95%–98% R.H. has been found to be feasible in actual practice and is recommended in order to accelerate the rate of humidification as much as possible. Operation between about 85–95% is possible but at some loss in the humidification rate.

The necessary increase in the moisture content of the roasted peanut pieces to fall within the limits already mentioned is at least theoretically possible at room temperature, i.e., about 80° F. Other factors being equal, the rate of humidification increases in more or less direct correspondence to increases in the temperature of the treatment atmosphere, and consequently, temperatures in the order of about 100–125° F. are preferred. At temperatures in the vicinity of 100° F. and above, condensation of liquid water can occur on the internal surfaces of the receptacle housing when peanuts are being treated, at least under circumstances where the ambient atmosphere in contact with the outer surface of the receptacle walls is significantly lower than the treatment temperature. Contact of the peanut pieces with liquid water during humidification has been found undesirable, leading to a condition known as "browning," and measures, for example, heating, hot water jacketing or draining, should be taken either to prevent such condensation or to avoid contact of the condensed water with the peanuts being treated. The utilization of one or more of such measures is especially important as the treatment temperature exceeds 100° F. At the other extreme, the temperature of the peanut pieces can be as high as 150° F. At the higher temperatures, it is more difficult to provide the high relative humidity needed to maintain the transfer in the desired direction, i.e., from the medium to the peanuts, and browning and caramelization are more likely to occur. Consequently, operation below about 125° F. is preferable. The temperatures mentioned here are of the treatment atmosphere and do not necessarily correspond to the actual temperature of the peanut pieces.

If the peanut pieces are arranged for treatment in the form of a layer or bed, thereby permitting a reasonable quantity to be treated at a time while avoiding attrition losses inherent in a tumbling or rolling mass, penetration of a layer or bed of any substantial size by a stagnant or gently-moving atmosphere to raise the moisture content to the necessary level is a slow process, especially in the case of fairly small peanut pieces. For this reason, passage of the atmosphere as a stream through the bed or layer at a moderately high velocity and under such positive pressure as is required for this velocity has been found most advantageous. For this purpose, the pieces are, of course, held by a porous support, such as a screen or grate. It has been found that the change in water content, i.e., the average humidification rate, of the peanut pieces, measured in pounds of water per pound of pieces per hour, varies exponentially with changes in velocity of the humidifying stream so that a plot of the two on semilog paper is a straight line. In the light of this experience, the maximum velocity of the treatment atmosphere for purposes of the present invention should be below the fluidization point of the particular pieces involved. This maximum cannot be easily defined on a precise quantitative basis as it will vary with the nature of the pieces themselves. For bed depths ranging from about five to about twenty inches and peanut pieces having a particle size within the fraction defined above, the fluidization point was found to correspond with an atmospheric velocity of between about 120–140 ft. per minute. It is preferred to operate at as high a velocity as possible short of fluidization and for at least these bed depths of this fraction, a velocity of around 100 ft. per minute gives consistently good results. Velocity below about 30 ft. per minute should, in general, be avoided because of the low rate of moisture transfer to the peanuts.

As would be expected, the peanut pieces absorb water vapor from the gas stream in direct proportion to their surface area or particle size. For larger pieces, such as whole or half kernels, a longer time is required for the water vapor to penetrate to the interior than is needed for smaller granulated pieces, and the time decreases in relation to the smallness of the particles. On the other hand, it will be appreciated that very small particle sizes will be subject to undesirable caking or lumping in the presence of the high humidity atmosphere of this system. Except in unusual circumstances then, the particle size of the peanut pieces should be such as to avoid the formation of a dense, unpenetrable mass throughout the humidification step.

In view of the large number of variables affecting the rate of humidification, including the relative humidity, the treatment temperature, the velocity of the treatment atmosphere, the depth of the peanut mass, the size of the peanut particles and so on, the time required for the peanuts to reach a moisture content within the stated limits cannot be precisely defined. It can only be stated that the humidification step should be continued for a period of time sufficient to produce the requisite increase in moisture content of the peanut pieces at the selected combination of conditions. This is best determined by periodic analysis for actual water content. However, mention can be made of two factors which provide a general indication of how the treatment is progressing. First, the humidification phase is accompanied at least during its early stages by entrainment of some of the volatile flavor components of the peanuts by the humidifying medium so that a strong flavor of roasted peanuts can be detected in the vicinity of the treatment apparatus. The system in which the peanuts are treated is not hermetically sealed. Positive measures can be taken to vent the system but most systems will afford sufficient leakage for this purpose. Once the strong odor can no longer be detected, reasonable basis exists for presuming that a satisfactory end point is being approached.

The second factor is based upon the temperature of the peanuts during the treatment. The mass of peanuts often experience at high absorption rates a perceptible rise in temperature of as much as 10–15° F. above that of the treatment atmosphere as the humidification progresses. This can be explained by the release of the latent heat of the absorbed water and/or of the heat of some undetermined reaction. In either case, the generation of heat by the mass of peanut pieces declines as the rate of absorption decreases. Consequently, if steps are taken to monitor the temperature of the mass of peanuts being humidified, the convergence of the peanut temperature with that of the treatment atmosphere can be taken as an indication that a suitable end point is near at hand provided that the humidity of the medium has remained at the proper high level. Obviously, both of these factors are imperfect measures at best and should preferably be confirmed by actual analysis. As experience in the practice of the invention is gained, it should be possible for these analyses to be made with greatly reduced frequency, or perhaps eliminated entirely, as one acquires the ability to predict with reasonable certainty the condition of the peanuts in the light of past experience. In general, for batch processing with peanut beds of a depth in the order of 20 inches or so, the humidification step using air of about 95% R.H. has been found to require several hours, six hours being adequate in most cases.

As already stated, the purpose of the humidification step is to raise the moisture content of the peanuts from an initial value after roasting and cooling from about 1–2.5% to within the range of 6–15% by weight. Very much below the 6% level, the amount of water introduced into the peanut pieces is not sufficient to reduce the flavor components remaining after treatment to the desired low level. In the great majority of cases, best results will be obtained between about 6 and about 10 percent and the latter value can be considered the preferred maximum. For reasons stated previously, so long as the water is carried in the treatment atmosphere as a true vapor, a water content of more than about 11–12% is almost impossible to achieve irrespective of the severity of the other humidification conditions, and higher levels can be obtained only by entraining actual particles of liquid water in the atmosphere or applying liquid water, in the form of a mist, for example, to the peanut bed. As already indicated, contact of the peanut pieces with liquid water should ordinarily be avoided as much as possible. The objectionable side effects resulting from such contact can be counteracted at least to some extent by the selection of very mild conditions in the subsequent treatment step but one is normally better advised to operate within the preferred limits. Above the 15% moisture level, the product will be rendered virtually inedible for most people.

Due to the swelling of the peanuts in a confined bed or other factors a completely quiescent condition for the bed is incompatible with rapid over-all humidification. Resort to rapid vibration of the bed of 20 inch depth has proved an unsatisfactory solution to either of these problems and has, in fact, been actually shown to promote the bed compaction as well as attrition of the particles. Such difficulties can, however, be greatly minimized if the particles in the bed are periodically disturbed and preferably bodily displaced, for example, in the case of a bed by merely inverting the receptacle from time to time, say every 15–30 minutes. Alternatively, a sweep or uplift type agitator, such as a revolving plow or a low pitch helical ribbon, could be provided especially in a continuous process. While the depth of the bed can be varied within rather wide limits to meet the needs of particular circumstances, the optimum depth will be that which strikes a reasonable balance between compaction and increased air resistance, on the one hand, and production capacity and similar cost factors on the other.

The output of the humidifying step can be collected and stored for further treatment at a somewhat later time. The interval between humidification and subsequent treatments should not normally however, exceed about four days if risk of spoilage is to be minimized.

The second step in the novel process of the present invention involves drying the humidified peanuts until their moisture content has been substantinally reduced, preferably to a moisture content of 4% or less. The particular manner of accomplishing this step is not considered to be critical. The art of drying granular material is very well developed at the present time and numerous techniques are known for this purpose, any one of which could be adapted to present needs with little or no difficulty. One convenient way of drying the humidified mass of peanut pieces is to merely discontinue the introduction of water vapor into the gas stream used for the humidification step and elevate the temperature of that stream to an extent appropriate for a reasonable rate of evaporation at the reduced humidity. The moisture content of the drying air can vary between about 0–50% R.H. for reasonably good results and a maximum of about 20% R.H. is preferred. At a given ambient relative humidity, heating of the drying air will reduce its relative humidity and, accordingly, increase the driving force for drying the peanuts. For this reason, higher temperatures of at least about 180° F. are preferred in the drying medium. Lower temperatures down to about 150° F. could, on the other hand, be used provided that a correspondingly low relative humidity prevails. In any event, the drying conditions should avoid undesirable effects, and a browning, burning, toasting and the like.

As far as is known, the rate of drying is dependent entirely upon such variables as temperature, pressure, bed depth, velocity of atmosphere, relative humidity differential, et cetera, and can be controlled by the appropriate selection of one or more of these variables. It is, therefore, evident that extreme latitude is available in the practice of this step. At least in the case of the bed depth and the velocity of the gas stream, the consideration discussed in connection with the humidification step will be equally applicable to the drying step. If a stream of hot gas is employed as the drying medium, care should be taken to insure that the drying conditions are not comparable to those of a roasting operation. Having already been roasted once in advance of the humidification step, the peanuts should not again be exposed to the equivalent of a second roasting step under the guise of a drying step, in the sense the latter term is employed here. As a general rule, a roasting treatment will involve considerably higher temperatures than those contemplated for the present drying step and will at some point result in the peanuts reaching a temperature in the vicinity of about 300° F. or above. Temperatures of this extreme should therefore be avoided in the practice of the present drying step. Only rarely will it be found either necessary or desirable to carry out the drying step at temperatures of 225° F. or above and, more frequently, a temperature up to about 200° F. is preferable.

The distinction between the two types of treatment can be perhaps best understood with reference to the difference in basic objectives. The roast is actually in the nature of a cooking operation, aiming at bringing about fundamental changes in the chemical and physical properties of the peanuts in the process and such drying that results is only incidental to the more fundamental objective. In distinct contrast, the purpose of the present drying step is merely to bring about a reduction in the moisture content of the peanuts under such mild conditions as to be non-conducive to further changes in the physicochemical properties thereof, other than moisture content. If these fundamental aims are kept in mind, no difficulty in successfully practicing the second step of the present invention should be experienced by anyone skilled in the art.

Preferably, exposure of the peanut pieces to the drying gas is continued until the moisture content of the peanuts has been reduced to 4% or less and at times a final moisture content approximating their original moisture content after roasting will be found particularly well suited to the needs of the ultimate food product. This is not to imply, however, that critical significance is attached to the figure of about 4%, as any such implication is not supported by actual experience. The actual proportion of water to be eliminated will depend upon the magnitude of the end point of the humidification step as well as upon the moisture content needed for purposes of the ultimate product. If that end point coincides with the lower end of the humidification range, say around 6–7%, a relatively small reduction in water content of about 2–3% may be adequate. With higher levels from humidification, however, e.g. about 9–10% or higher, the removal of greater amounts of water, say 4–5% or more, is usually more advantageous. In either case, a final moisture content best suited to the needs of the ultimate product should be taken into account. One will consequently appreciate that the aim of the present drying step is not so much to bring the peanut pieces to any particular final level of moisture content as to remove from the peanuts a substantial amount of the water added thereto during the humidification step. To give an overall criterion, it can be said that elimination from the humidified peanuts of at least about 50% of their moisture content, and perhaps as high as 75% for the upper end of the humidification range, is beneficial. However, this is not a hard and fast requirement since, in the case of peanuts humidified to a lesser extent, to say about 6%, a reduction of about 33% of that value will be found to suffice.

Although a reduction in the moisture content of the humidified peanuts via a drying step is ordinarily contemplated as an important feature of this invention, where a relatively large amount of water is introduced during humidification, i.e. to a content of about 10% or more, a significant reduction in strong flavor components is achieved without drying. If this moisture content is compatible with the requirements of the food product, the peanuts can be used without further treatment. However, undried treated peanuts at this moisture level are subject to mold formation and deterioration and drying is normally advisable to avoid such problems and to produce a greater extent of flavor removal.

After the peanuts have been dried in the manner indicated, they are ready to be used for the intended purpose without further treatment. They can be eaten directly, if desired, and will be found to have a pleasant bland taste which is similar in some respects to toasted protein, with a quality faintly or mildly reminiscent of roasted peanuts, but lacking the strong overpowering flavor characteristics of untreated roasted peanuts. Thus, it will be seen that the goal of the invention is not necessarily to destroy completely the peanut flavor but rather to remove and eliminate those strong flavors which are incompatible with the flavors of other materials, and which tend to change in an unpleasant way in the presence of moisture. In terms of physical texture, the present product retains the desirable crisp, chewy character of normal roasted peanuts as well as their high nutritive value. Dependent upon the amount of water ultimately retained, the crunchiness or hardness of the treated peanuts may or may not correspond exactly to that of the untreated, roasted peanuts, but the bite sensation they do provide is entirely adequate to provide an appealing texture interest to a variety of food products.

The shelf life of the present treated peanuts when contained in a suitable sealed package is generally good, but if they are to be retained in this state for any extended period of time, resort to additives or other measures of a preservative kind, as is commonly employed for roasted peanuts, is suggested. This includes, inter alia, the addition of a few parts per million of an antioxidant, such as butylated hydroxyanisole and/or butylated hydroxytoluene, to assist in forestalling rancidity.

The limits upon the ranges of treatment conditions specified above have been determined strictly in accordance with their effectiveness for roasted peanuts. Other legumes, including soy beans in particular, are therefore excluded from the scope of raw materials suitable for the practice of the invention. True nuts, such as walnuts, pecans, and the like, differ in rather basic respects from peanuts and, similar to soybeans, do not respond in the desired fashion to this process.

In the accompanying drawings, FIG. 1 is a flow sheet illustrating in general fashion the steps involved in the present invention and FIG. 2 is a schematic diagram of one embodiment of apparatus useful for carrying out the invention on a batch basis.

The explanation of the two steps by which the invention is characterized will have already suggested to one skilled in the art a number of systems of apparatus suitable for their performance. However, in order to illustrate one system that has been found to give very satisfactory results at least on a pilot plant scale, reference may be had to FIG. 2 of the drawing illustrating one embodiment of a batch apparatus. In FIG. 2, the numeral 10 designates a cylindrical receptacle, such as a drum or the like, having its ends closed by screens 12 of a mesh size less than the particle size of the peanut pieces to be treated but otherwise unobstructed. At least one of the screens should be capable of removal to permit a charge of peanuts to be loaded into the receptacle to form a bed B. The lower end of the receptacle rests upon the open end of a generally funnel-shaped member 14, supported in any way (not shown) suitable to bear the weight of the receptacle and bed B, through which the treatment atmosphere is supplied to the peanut bed by means to be described shortly. Member 14 may terminate at its upper end with a detachable coupling 16 such as a band clamp for engagement with the rim of the receptacle to hold the same in place. The upper end of receptacle 10 is adapted to be covered by a hood 18, likewise equipped with a detachable coupling 20 similar to coupling 16 for engagement with the receptacle rim. Hood 18 is in communication with the end of a section of conduit 21 which is preferably flexible. The flexible conduit section 21, is, in turn, connected by means of a suitable joint or the like, not shown, to a fixed conduit section 22 designed to convey a stream of gas flowing therethrough in an endless or continuous path. At one point along the length of section 22 preferably adjacent flexible section 21, is an externally accessible damper 24 for controlling the flow of gas through this path. At another point, there is an electrical heater 26 for elevating the temperature of the gas. Heater 26 is shown in the form of strips extending parallel to the adjacent conduit walls but other forms, such as coils and the like, could obviously be substituted. Downstream from heater 26, the gas passes through a humidification unit 28 into which water is admitted during the humidification step of the process to impart the desired relative humidity to the gas. While various types of humidification units are known in the art and are more or less equally serviceable in this system, good results have been obtained through the medium of a bed of packing, such as ⅜ inch Rashing rings or burl saddles of comparable size, retained between two spaced vertically arranged screens 29, which bed is sprayed with water from a nozzle, not shown. The unit 28 can include an outlet for excess water. If the depth of the bed of packing and the rate of the water injection has been correlated properly to the mass velocity of the gas stream penetrating the backing, the latter will be essentially saturated with water vapor. At the same time, the packing tends to prevent the gas stream from entraining discrete particles of the water. The outlet from humidification unit 28 is connected to the inlet of a fan 30 driven by a prime mover, not shown. The outlet of fan 30 is connected, in turn, to the lower end of member 14, completing the conduit circuit. Location of the fan in advance of the humidification unit is a desirable modification. Control data useful in determining and regulating the course of the treatment can be obtained by means of appropriate instrumentation, including a relative humidity indicator or hygrometer 32 and a Pitot tube or other anemometer 34, situated within funnel 14 just upstream of the bottom of the peanut bed, and a thermometer 36 inserted in the wall of receptacle 10 for sensing the temperature of the bed itself.

In the processing of batches of peanuts in the system of FIG. 2, the receptacle 10 is removed from the member after hood 18 has been detached and moved to an out-of-the-way position and is charged with peanuts through one end until the desired depth of bed exists therein. The charged receptacle is then returned to rest upon the member 14, hood 18 is fitted in place, and couplings 16 and 20 are engaged with the corresponding rims. Assuming that ambient air serves as the carrier gas for the water vapor during the humidification step, as is preferred, such air is naturally already present in the system. When all is in readiness, water is injected into the top of the packed bed humidification unit, electric current is supplied to heaters 26, and fan 30 is set in motion. Thus, the air in the system is propelled continuously therearound, absorbing heat and water vapor from the heater and humidification unit, respectively, and giving up the heat and water vapor to the peanut bed upon passage therethrough. Control over the temperature of the peanut bed is, of course, maintained by regulating the amount of current fed to heater 26 while the relative humidity can be controlled by regulating the amount of water supplied to unit 28. Following the preferred practice, little actual control over the latter factor is necessary, the water being merely furnished in sufficient quantities to insure that the gas stream remains as nearly saturated as possible, any excess water being discharged from the bottom of the unit to a drain or disposal point. Gross control over the velocity of the gas stream through the peanut bed is possible by regulation of the speed of fan 30, while damper 24 can be adjusted for a finer degree of control. Periodically during the humidification step, the receptacle 10 is inverted or otherwise stirred so as to disturb the peanut bed and promote more uniform humidification. To this end, an appropriate free space 38 should be left when the receptacle is charged.

When the humidification step has continued sufficiently to raise the moisture content of the peanut bed to within the limits already specified, the drying step may be initiated. In the system of the drawing, all that is required to convert from humidification to drying is the discontinuance of the introduction of water into the humidification unit and the removal of hood 18 from receptacle 10. An increase in the heat given off by heater 26 to the now drying air stream may or may not be required depending primarily upon the ambient humidity of the air. With the hood 18 in drying position, as indicated in the dotted lines in the figure, the drying gas stream is discharged into the atmosphere after passage through the peanut bed, fresh air being drawn in through the hood. Periodic inversion of the receptacle is practiced during drying similar to that done during humidification.

The performance of the system of FIG. 2 has been found entirely adequate for purposes of processing peanut batches on a pilot plant scale. However, no implication is intended that the practice of the present process is limited to this particular system, as the construction of a number of systems equal to or better than that of FIG. 2 is within the capacity of one skilled in the art. For example, the arrangement of the peanut pieces as a layer on an endless screen moving through a humidification zone and a drying zone would be one conceivable form of continuous system.

The following specific examples may serve to illustrate in greater detail the manner in which the process can be carried out in actual practice:

*Example I*

Typically roasted, blanched and split Spanish peanuts, commercial grade #1, are freed of their hearts and granulated to an average particle size of about 7 mesh. Fifteen pounds of the peanut granules are charged to a depth of 20 inches into a cylinder having a diameter of about seven inches and having its ends closed by screens of about 14 mesh. An air stream having a relative humidity between 98–100% and a temperature of 100°±5° F. is blown upwardly through the bed of peanuts thus formed for a period of 6.5 hours, at which point the moisture content of the peanut pieces is 8.2% by weight. The bed is now dried in an air stream of similar velocity having a temperature of 180° F.±10° and a relative humidity of about 10% for six hours, the moisture content of the peanuts then being about 2%. When the peanuts so treated are smelled and tasted, the flavor and odor characteristics are found to be greatly diminished from those of untreated, roasted peanuts.

*Example II*

Typically roasted, blanched and split Runner peanuts, commercial grade #1, are freed of their hearts and granulated to the same average of particle size specified in the previous example. Two hundred pounds of the peanuts so granulated are processed in the apparatus of FIG. 2, using a receptacle having a diameter of about 24 inches to give a bed depth of about 24 inches. For the humidification step, an air stream is maintained at a superficial velocity of about 100 ft. per minute, a relative humidity within the range of 87–97%, and a temperature of about 105–115° F. is passed through the bed for about six hours. The receptacle is inverted at intervals of 60 min. At the end of the six hour humidification period, the moisture content of the peanuts is 6.3% by weight. For the drying step, the air stream is maintained at a similar velocity, a temperature of 180° F.±10° and a relative humidity of about 10%. Drying is continued for six hours to give a final moisture content to the peanuts, when cooled, of about 3–4%. As in Example I, the peanuts treated are found to be substantially free of the strong odor and flavor components characteristic of roasted peanuts.

*Example III*

Example II was repeated using split roasted Spanish peanuts otherwise similar to those processed in Example I. The humidifying gas stream is maintained at a velocity of 100 ft. per minute, and a relative humidity of about 98%. The time required to produce an average moisture content in the peanuts of about 5.9% by weight as the result of exposure to this gas stream is about six hours. For drying, a similar air stream having a temperature of 180° F.±10° and a relative humidity of about 10% is used for six hours. This reduces the moisture content of the peanuts to about 3–4%. The flavor and odor of the peanuts so treated is essentially similar to that of the peanuts treated in the preceding examples.

During the general description of the practice of the invention, mention was made of a number of possible variations in the conditions and in the mode of applying these conditions to the peanut pieces. Other variations and modifications will, of course, be within the skill of the art. For instance, instead of carrying out the humidification step in one continuous operation and the drying step in a subsequent continuous operation, one can accomplish essentially the same result by adding and removing the same amount of water in multiple small increments or stages.

Having described the invention, that which is claimed is:

1. A process for removing strong flavor components from roasted, blanched peanuts containing not more than about 3% water by weight which comprises the steps of maintaining the peanuts in intimate contact with a gaseous humidifying medium having a relative humidity of at least about 60% and a temperature of about 80–150° F. for a time sufficient to increase the moisture content of said peanuts to about 6–15% by weight and thereafter drying said peanuts to substantially reduce the moisture content thereof.

2. The process of claim 1 wherein the gaseous humidifying medium has a relative humidity of at least about 85%.

3. The process of claim 1 wherein the moisture content of said peanuts is reduced by about 33%–75% of that obtained by exposure to said high humidity medium, the extent of reduction in moisture content generally increasing in accordance with increasing moisture content of said peanuts.

4. The process of claim 1 wherein the moisture content of said peanuts after contact with said atmosphere is about 6–10% by weight and the moisture content after drying is not in excess of about 4%.

5. The process of claim 1 wherein said peanuts are dried by intimate contact with a gaseous atmosphere having a relative humidity up to about 50% and a temperature of about 150–200° F.

6. The process of claim 1 wherein peanuts are in a form selected from the group consisting of whole kernels, half kernels, and discrete granules.

7. A process for removing strong flavor components from roasted, blanched peanuts containing up to about 3% water by weight which comprises the steps of confining said peanuts in a bed of generally uniform thickness, passing through said bed a stream of gaseous medium having a relative humidity of at least about 60% and a temperature of about 80–150° F. for a time sufficient to increase the moisture content of the peanuts in said bed to about 6–15% by weight and thereafter drying the peanuts to a moisture content substantially below about 6%.

8. The process of claim 7 wherein the gaseous humidifying medium has a relative humidity of at least about 85%.

9. The process of claim 7 wherein said gas stream has a velocity of at least about 30 ft. per minute but not sufficient to fluidize said bed.

10. The process of claim 7 wherein said bed is disturbed periodically, the peanuts therein being otherwise maintained essentially free of motion relative to each other.

11. The process of claim 7 wherein the peanuts are dried by passing through said bed a stream of gas having a relative humidity below about 50% and a temperature of about 150–200° F.

12. The process of claim 7 wherein said peanuts are dried to a moisture content not in excess of about 4%.

References Cited by the Examiner
UNITED STATES PATENTS

| | | | |
|---|---|---|---|
| 1,664,334 | 3/1928 | Thompson et al. | 99—126 X |
| 1,789,946 | 1/1931 | Rector | 99—126 |
| 2,809,114 | 10/1957 | Swarthout et al. | 99—126 |

FOREIGN PATENTS

| | | |
|---|---|---|
| 508,044 | 12/1954 | Canada. |

OTHER REFERENCES

Perry: "Chemical Engineers' Handbook," 3rd ed., 1950, McGraw-Hill Book Co. Inc., N.Y., p. 820.

A. LOUIS MONACELL, *Primary Examiner.*

BEATRICE H. STRIZAK, *Examiner.*